2,726,543
FORCE MEASURING GAUGE FOR LAP PINS

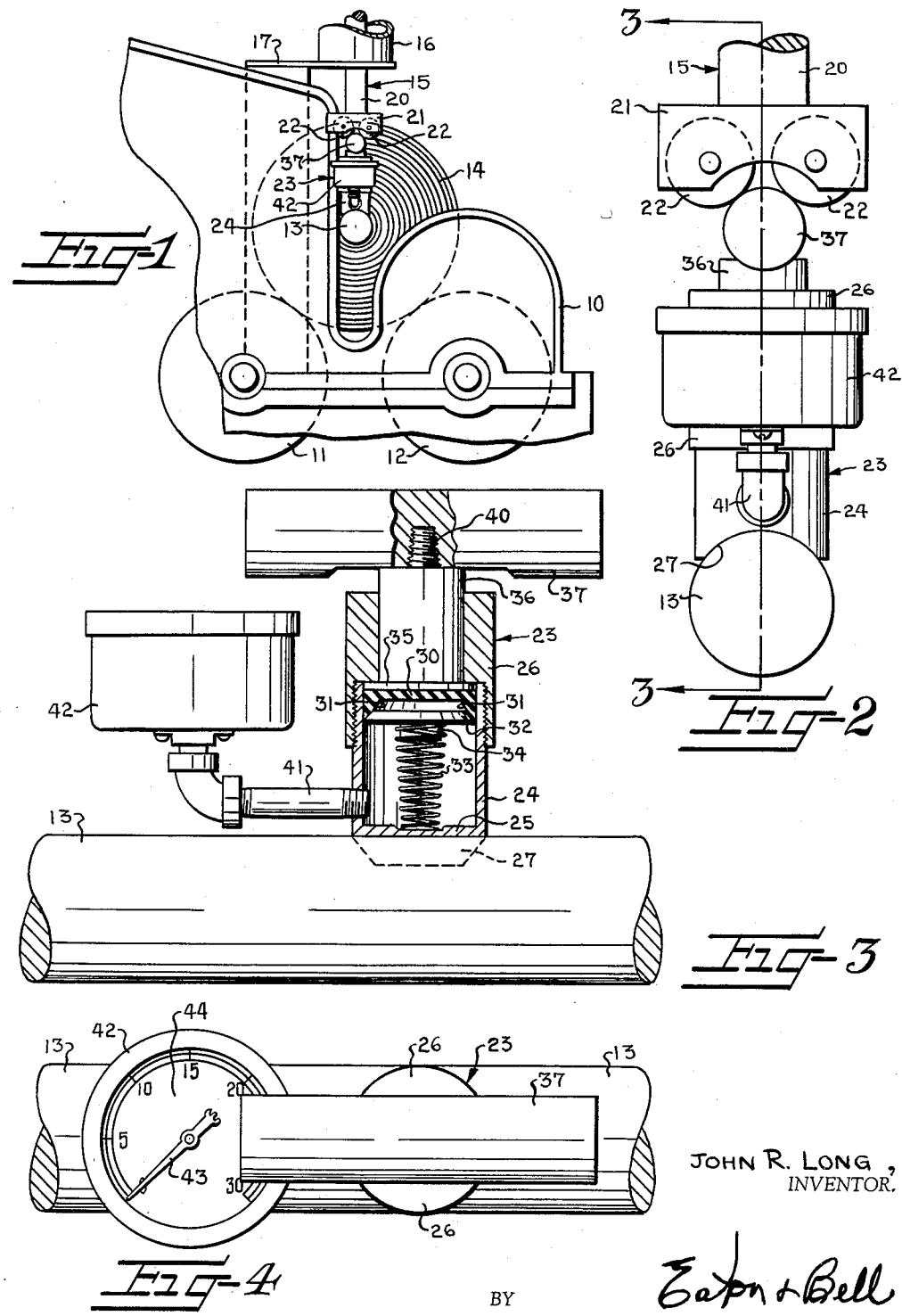

John R. Long, Hickory, N. C.

Application December 24, 1952, Serial No. 327,797

2 Claims. (Cl. 73—141)

This invention relates to force measuring gauges and more especially to a gauge especially designed to be interposed periodically for short periods of time between the lap pin of a textile machine and the pressure applying means therefor to determine the amount of force exerted on the lap pin of a textile picker machine or lapping machine by the usual pressure applying means associated with such machines.

As is well known to those familiar with the art, opposite ends of the lap pin of a picker or lapping machine must each be urged downwardly under uniform pressure so the lap pin and the lap wound thereon are uniformly urged against the supporting rollers therefor throughout the length thereof, in order to insure that the lap is wound about the lap pin uniformly throughout its width and to thereby eliminate thick and thin areas therein.

In order to accurately determine the force exerted by the usual pressure applying means on each end of the lap pin, it is a more specific object of this invention to provide a gauge assembly comprising a cylinder which is closed at its lower end and the lower closed end of which has a transverse concave groove therein adapted to fit against the lap pin. A piston is mounted for sliding movement longitudinally in said cylinder and is normally resiliently urged into engagement with the lower end of a piston rod which slidably penetrates the cylinder head. A transverse rod, circular in cross-section, is fixed to the upper end of the piston rod and the lower portion of the cylinder has a suitable fluid force responsive indicator communicatively connected thereto.

The cylinder may contain oil or other fluid and, upon the usual head block of the picker pressing downwardly against the transverse rod on the upper end of the piston and, with the concave groove of the cylinder engaging the lap pin, the force exerted by the head block causes the piston rod and piston to move downwardly in the cylinder to thus force the fluid into the indicator which indicates the amount of force exerted by the force applying means embodied in the head block.

It is still another object of this invention to provide a gauge assembly which includes a minimum of parts, may be economically produced and which is of relatively light, durable construction.

Some of the objects of the invention having been stated, other objects will appear as the description proceeds, when taken in connection with the accompanying drawings, in which—

Figure 1 is a fragmentary side elevation of a portion of a lapping machine or picking machine showing the lap pin thereof with a lap wound therearound and showing the improved gauge assembly in association therewith;

Figure 2 is an enlarged fragmentary elevation of the central portion of Figure 1;

Figure 3 is a vertical sectional view through the improved gauge assembly, taken substantially along the line 3—3 in Figure 2, but omitting the head block and showing the indicator therefor and the lap pin in elevation;

Figure 4 is a top plan view of the structure shown in Figure 3.

Referring more specifically to the drawing, the numeral 10 indicates the frame of a lapping machine or picker which has journaled therein lap supporting rolls 11 and 12, downwardly towards which a conventional lap pin 13 and its accumulated lap 14 are urged by a suitable pressure or force applying means broadly designated at 15. This pressure applying means may be of a type disclosed in my co-pending application entitled Head Block for Lapping Machines, Serial Number 327,796, filed December 24, 1952, and includes a pair of cylinders 16, only one of which is shown, each of which is disposed above the protruding opposite ends of the lap pin 13.

Each cylinder 16 is supported on a suitable standard or bracket 17 carried by the frame 10. Suitable means, not shown, normally urge a piston rod 20, mounted for vertical movement in the cylinder 16, downwardly toward the lap pin 13. The piston rod has a head block 21 fixed on the lower end thereof in which a pair of rollers 22 are rotatably mounted, these rollers 22 being adapted to normally engage and urge the lap pin 13 downwardly toward the supporting rolls 11 and 12.

Now, in order to determine the amount of force exerted, by the rollers, 22, on each end of the lap pin 13, I have provided an improved gauge assembly broadly designated at 23 and comprising a cylinder 24 adapted to be filled with oil or other fluid, not shown, and whose lower end is closed, as at 25, and on the upper end of which a cylinder head or piston rod guide 26 is suitably secured, as by being threaded thereonto. The lower surface of the closure portion 25 on the cylinder 24 is provided with a concave groove 27 which conforms substantially to the curvature of the lap pin 13 and is adapted to rest in engagement with said lap pin 13.

Mounted for longitudinal or vertical sliding movement in the cylinder 24 is a gland or piston cup 30 preferably of resilient material, such as rubber, and which has an internally tapered flange portion 31 integral therewith which is engaged by the correspondingly tapered edge of a disk 32. The lower surface of the disk 32 is engaged by a compression spring 33 which extends downwardly and engages the inner surface of the closure member 25. The spring 33 is maintained in central position against the lower surface of the disk 32 by a projection 34 integral with the disk 32.

The upper surface of the gland or piston cup 30 is normally urged into engagement with the lower surface of an enlarged portion 35 of a piston rod 36 which slidably penetrates the cylinder head 26 and has fixed on the upper end thereof a transverse gauge bar 37 which is preferably circular in cross-section. In this instance, the upper end of the piston rod 36 is provided with a reduced threaded portion 40 which is threadably embedded in the transverse shaft or rod 37 for securing rod 37 to the upper end of the piston rod 36.

The enlarged portion 35 of the piston rod 36 normally seats against the lower surface of the cylinder head 26, by virtue of the compression spring 33, and this portion 35 is of slightly less diameter than the inner diameter of the cylinder 24 in order to have sliding movement therein. Connected to the lower portion of the cylinder 24, by a nipple or pipe 41, is a fluid pressure indicator 42 of any desired construction and which has a movable hand or pointer 43 and a dial 44 including numerals thereon to indicate the amount of pressure in the pipe or nipple 41.

Of course, when the piston 30 is in the raised position shown in Figure 3, the oil or other fluid in the cylinder 24 is not under pressure and, therefore the pointer or hand 43 will assume the position in line with the zero in Figure 4. It is evident that the rod 37 is preferably circular in cross-section so that the rollers 22 may engage the same as shown in Figure 1 during determination of the amount of downward force exerted by the rollers 22 and head block 21 toward the lap pin 13.

After the gauge assembly 23 has been positioned as shown in Figures 1 and 2, the piston rod 20 is placed under pressure in the usual manner or as shown in my said co-pending application, whereupon the piston rod 36, piston cup 30 and the disk 32 will be forced downwardly in the cylinder 24 to, in turn, force the oil or other fluid therein into the pipe 41 and to thus move the hand or pointer 43 to indicate on the dial 44 the amount of force exerted by the rollers 22 of the head block 21 toward the lap pin 13.

It is thus seen that I have provided a simple and effective means to quickly determine the amount of force exerted by the head block on the lap pin 13.

In the drawings and specification there has been set forth a preferred embodiment of the invention and, although specific terms are employed, they are used in a generic and descriptive sense and not for purposes of limitation, the scope of the invention being defined in the claims.

I claim:

1. A gauge assembly adapted to be periodically used between a lap pin on a lap-forming machine and the pressure applying means for the lap pin comprising a cylinder, closure means at one end of said cylinder and provided with a concave groove in the outer end thereof adapted to fit onto the lap pin, a resilient piston cup mounted for longitudinal sliding movement in said cylinder, said piston cup having an outwardly tapering flange integral therewith facing toward the closure means on the cylinder, a disk having its edge tapered to conform substantially to the taper of said flange on the piston cup, resilient means normally urging said disk into engagement with the tapered flange of said piston cup to, in turn, urge the piston cup away from the closure means on said cylinder, a cylinder head fixed to the end of said cylinder remote from its closure means, a piston of lesser diameter than said piston cup mounted for longitudinal sliding movement in said cylinder head and against the inner surface of which said piston cup is urged by said resilient means, a relatively short transverse bar fixed to the outer end of said piston rod and being circular in cross-section and adapted to be engaged by the pressure applying means for the lap pin, and indicator means communicatively connected to said cylinder at a point remote from the cylinder head and responsive to the fluid pressure in the cylinder.

2. A gauge assembly comprising a cylinder, closure means for one end of said cylinder and having a concave diametrically extending groove therein, a cylinder head closing the other end of said cylinder, a piston rod mounted for longitudinal movement in said cylinder head, a piston mounted on the piston rod for longitudinal movement in said cylinder, means normally resiliently urging said piston and piston rod outwardly relative to the closure member, a transverse pin secured to the outer end of the piston rod, a fluid pressure responsive indicator, and means communicatively connecting the indicator to said cylinder whereby the surface defining the groove in the outer surface of the closure member may be positioned against a circular rod and the inward pressure applied to said piston rod and the fluid in said cylinder will then be forced through said means connecting the indicator to the cylinder to indicate the amount of pressure being exerted against the outer end of the piston rod.

References Cited in the file of this patent

UNITED STATES PATENTS

| 1,361,990 | Hatcher et al. | Dec. 14, 1920 |
| 1,580,430 | Gaines | Apr. 13, 1926 |
| 2,090,188 | Dahlstrom | Aug. 17, 1937 |
| 2,109,936 | Tice | Mar. 1, 1938 |
| 2,576,221 | Segerstad | Nov. 27, 1951 |
| 2,643,872 | Wise | June 30, 1953 |